US008559306B2

(12) United States Patent
Gong et al.

(10) Patent No.: US 8,559,306 B2
(45) Date of Patent: Oct. 15, 2013

(54) END-TO-END PACKET AGGREGATION IN MESH NETWORKS

(75) Inventors: Xiaohong Gong, Milpitas, CA (US); Patrice R. Calhoun, Pleasanton, CA (US); Robert B. O'Hara, Jr., Santa Clara, CA (US); David S. Stephenson, San Jose, CA (US); Johannes Petrus Kruys, Harmelen (NL); Lu Qian, Solon, OH (US)

(73) Assignee: Cisco Technology, Inc., San Jose, CA (US)

( * ) Notice: Subject to any disclaimer, the term of this patent is extended or adjusted under 35 U.S.C. 154(b) by 996 days.

(21) Appl. No.: 12/030,650

(22) Filed: Feb. 13, 2008

(65) Prior Publication Data

US 2009/0201898 A1 Aug. 13, 2009

(51) Int. Cl.
*H04L 12/28* (2006.01)

(52) U.S. Cl.
USPC .......................................................... 370/231

(58) Field of Classification Search
None
See application file for complete search history.

(56) References Cited

U.S. PATENT DOCUMENTS

| 6,721,334 | B1 * | 4/2004 | Ketcham ........................ 370/473 |
|---|---|---|---|
| 6,850,490 | B1 * | 2/2005 | Woo et al. ...................... 370/230 |
| 7,400,578 | B2 * | 7/2008 | Guthrie et al. ................. 370/229 |
| 7,447,233 | B2 * | 11/2008 | Narad et al. ................... 370/473 |
| 7,729,328 | B2 * | 6/2010 | Thubert et al. ................. 370/338 |
| 7,769,044 | B2 * | 8/2010 | Xu ................................. 370/473 |
| 7,839,876 | B1 * | 11/2010 | Goel et al. ..................... 370/412 |
| 7,912,976 | B2 * | 3/2011 | Guthrie et al. ................. 709/232 |
| 8,161,145 | B2 * | 4/2012 | Carpenter et al. ............. 709/223 |
| 2004/0170123 | A1 * | 9/2004 | Carpenter et al. ............. 370/229 |
| 2006/0029099 | A1 * | 2/2006 | Jang et al. ...................... 370/473 |
| 2006/0039385 | A1 * | 2/2006 | Bare et al. ...................... 370/400 |
| 2006/0133274 | A1 * | 6/2006 | Lee et al. ....................... 370/230 |
| 2006/0140216 | A1 * | 6/2006 | Joshi et al. ..................... 370/468 |
| 2006/0280194 | A1 * | 12/2006 | Jang et al. ...................... 370/412 |
| 2007/0211682 | A1 | 9/2007 | Kim ................................ 370/338 |
| 2007/0291793 | A1 * | 12/2007 | Jang et al. ...................... 370/473 |
| 2008/0049654 | A1 * | 2/2008 | Otal et al. ....................... 370/311 |
| 2008/0192774 | A1 * | 8/2008 | Singh et al. .................... 370/473 |

FOREIGN PATENT DOCUMENTS

WO WO2007047757 A1 4/2007

OTHER PUBLICATIONS

Draft Standard for Information Technology—Telecommunications and information exchange between systems—Local and metropolitan area networks—Specific requirements. Part 11: Wireless LAN Medium Access Control (MAC) and Physical Layer (PHY) specifications: Amendment 4: Enhancements for Higher Throughput. Prepared by the 802.11 Working Group of the 802 Committee, New York, NY. Copyright 2007 by IEEE.

(Continued)

*Primary Examiner* — Gregory Sefcheck
(74) *Attorney, Agent, or Firm* — Baker Botts L.L.P.

(57) ABSTRACT

A packet aggregation system. In particular implementations, a method includes accessing one or more transmit queues, each corresponding to a wireless client associated with a given wireless mesh access point of a plurality of mesh access points. The method further includes selecting a mesh access point of the plurality of mesh access points and selecting a transmit queue corresponding to a wireless client associated with the selected mesh access point. The method further includes aggregating packets that are destined for the selected wireless client, up to a size limit, taking into account the path to the selected mesh point as well as quality of service constraints, and composing and transmitting the aggregated packet to the selected mesh access point.

19 Claims, 7 Drawing Sheets

(56) References Cited

OTHER PUBLICATIONS

Lin, Yuxia and Vincent W.S. Wong, "Frame Aggregation and Optimal Frame Size Adaptation for IEEE 802.11n WLANs", Department of Electrical and Computer Engineering, The University of British Columbia, Nov. 2006.

Wi-Fi Certified 802.11n draft 2.0: Longer-Range, Faster-Throughput, Multimedia Grade Wi-Fi Networks, Wi-Fi Alliance. Copyright 2007.

Cheng et al., Heuristic Algorithms for Real-Time Data Aggregation in Wireless Sensor Networks, Proceedings of the 2006 International Conference on Wireless Communications and Mobile Computing, pp. 1123-1128, XP002520935, Jul. 3, 2006.

Fan et al., Structure-Free Data Aggregation in Sensor Networks, IEEE Transactions on Mobile Computing, IEEE Service Center, Los Alamitos, CA, US, vol. 6, No. 8, pp. 929-942, XP011186228, Aug. 1, 2007.

PCTUS2009030386, Partial Search Report, Invitation to Pay Additional Fees and, Where Applicable, Protest Fee, EPO, Jan. 8, 2009.

Jain et al., Benefits of Packet Aggregation in Ad-Hoc Wireless Network, Technical Report CU-CS-960-03, Department of Computer Science, pp. 1-23, XP002520934, Aug. 2003.

Kassler et al., VoIP Packet Aggregation based on Link Quality Metric for Multihop Wireless Mesh Networks, Proceedings of the Future Telecommunication Conference, pp. 1-6, XP-002520933, Oct. 2007.

Raghavendra et al., IPAC: IP-based Adaptive Packet Concatenation for Multihop Wireless Networks, Asilomar Conference on Systems, Signals and Computing, pp. 1-9, XP002520932, 2006.

Raniwala et al., Architecture and algorithms for an IEEE 802.11-based multi-channel wireless mesh network, INFOCOM 2005. 24th Annual Joint Conference of the IEEE Computer and Communications Societies, Proceedings IEEE Miami, FL, USA Mar. 13-17, 2005, vol. 3, pp. 2223-2234. XP010829112, Mar. 13, 2005.

European Patent Office Communication Pursuant to Article 94(3) EPC; Application No. 09 709 969.1-2415; Ref. P33405EP-PCT, dated Apr. 14, 2011, 8 pgs.

* cited by examiner

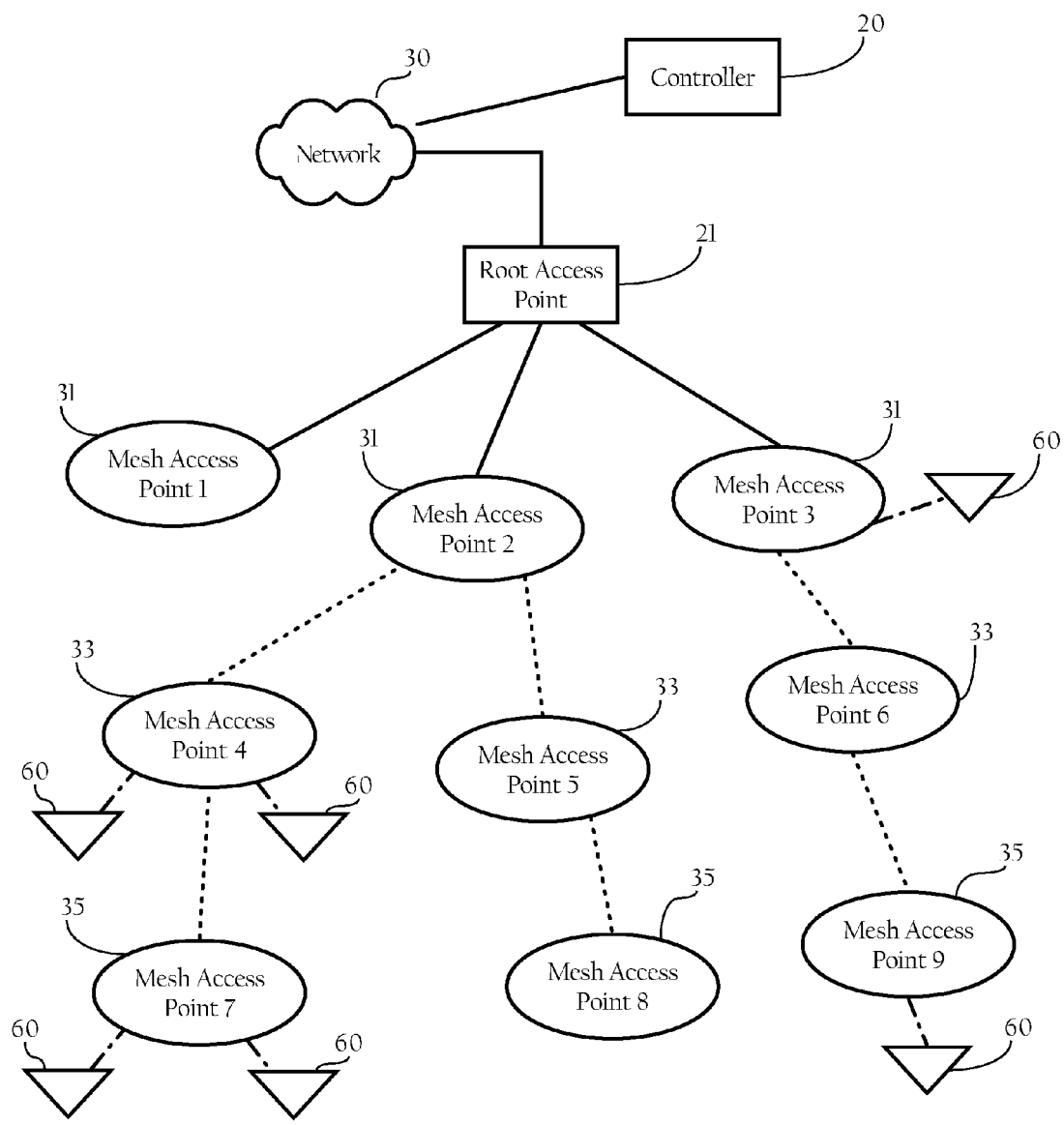
Fig._1

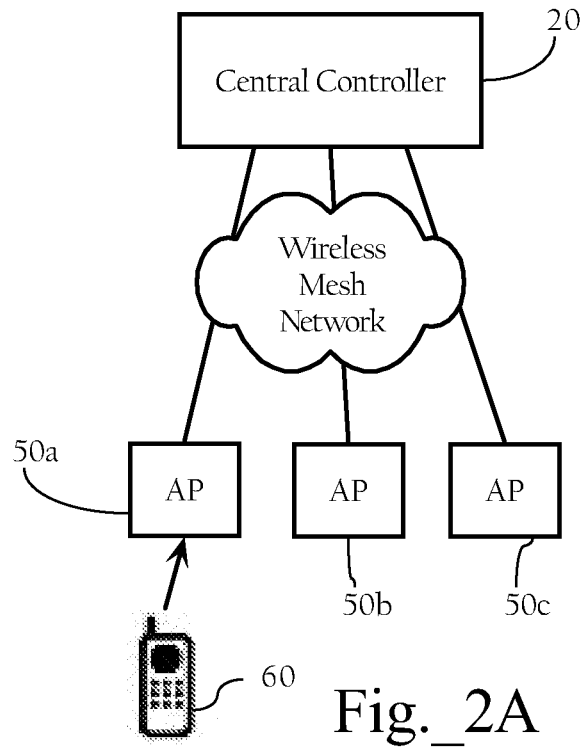
Fig._2A
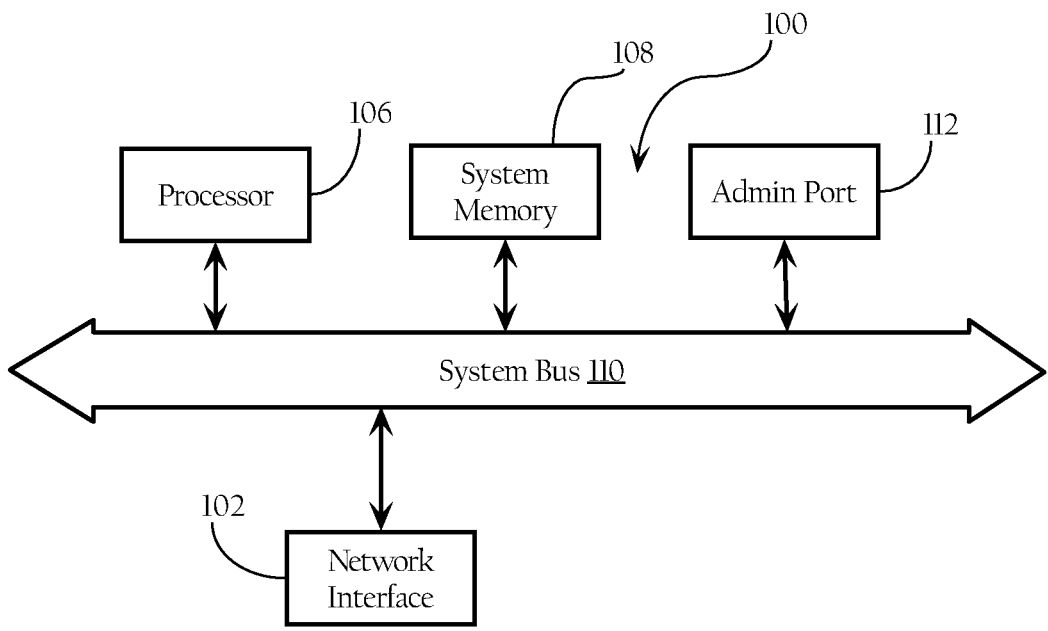
Fig._2B

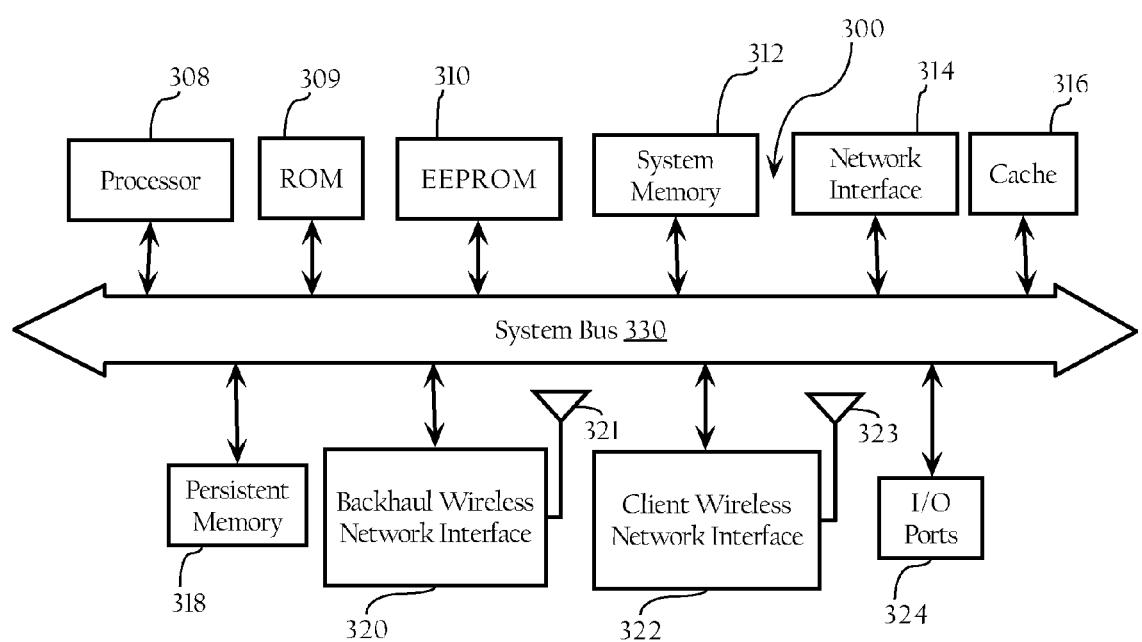
Fig._3

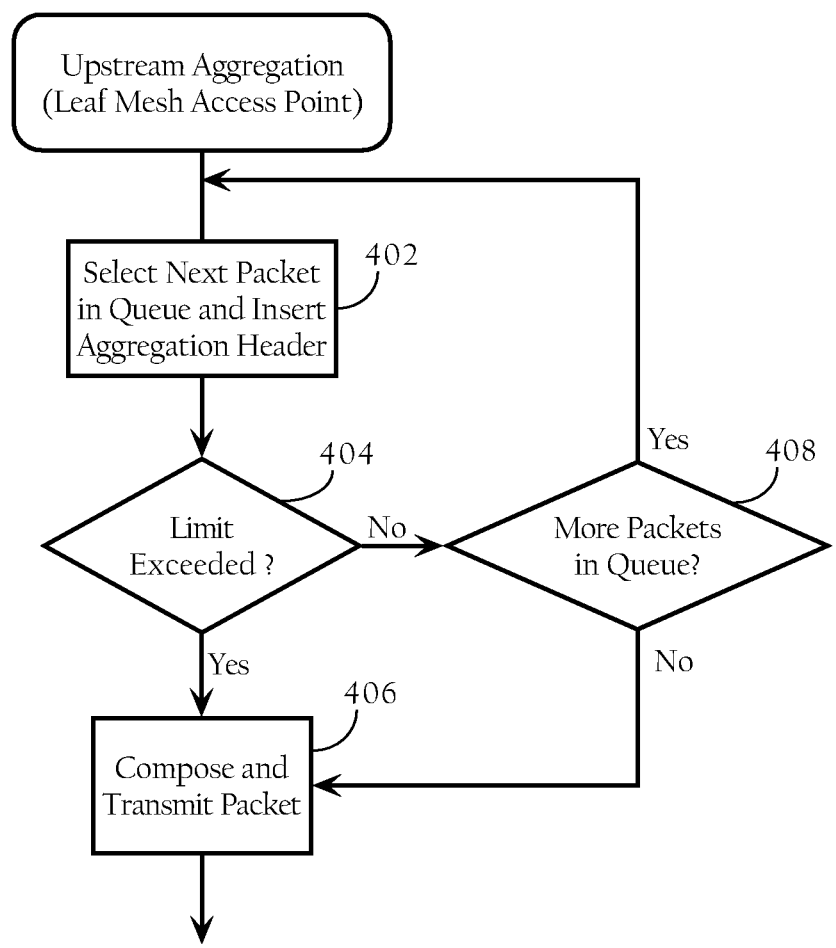
Fig._4

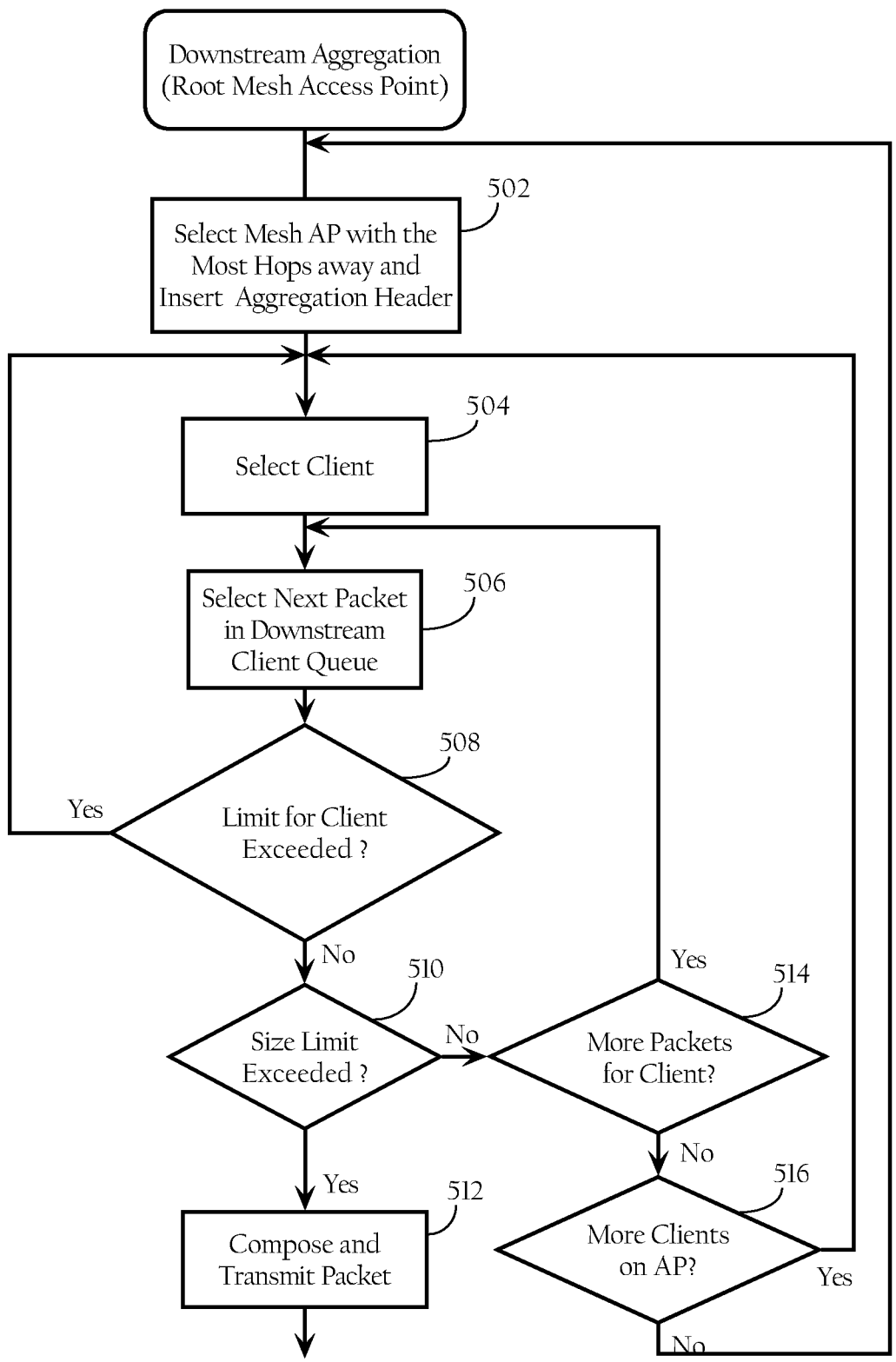
Fig._5

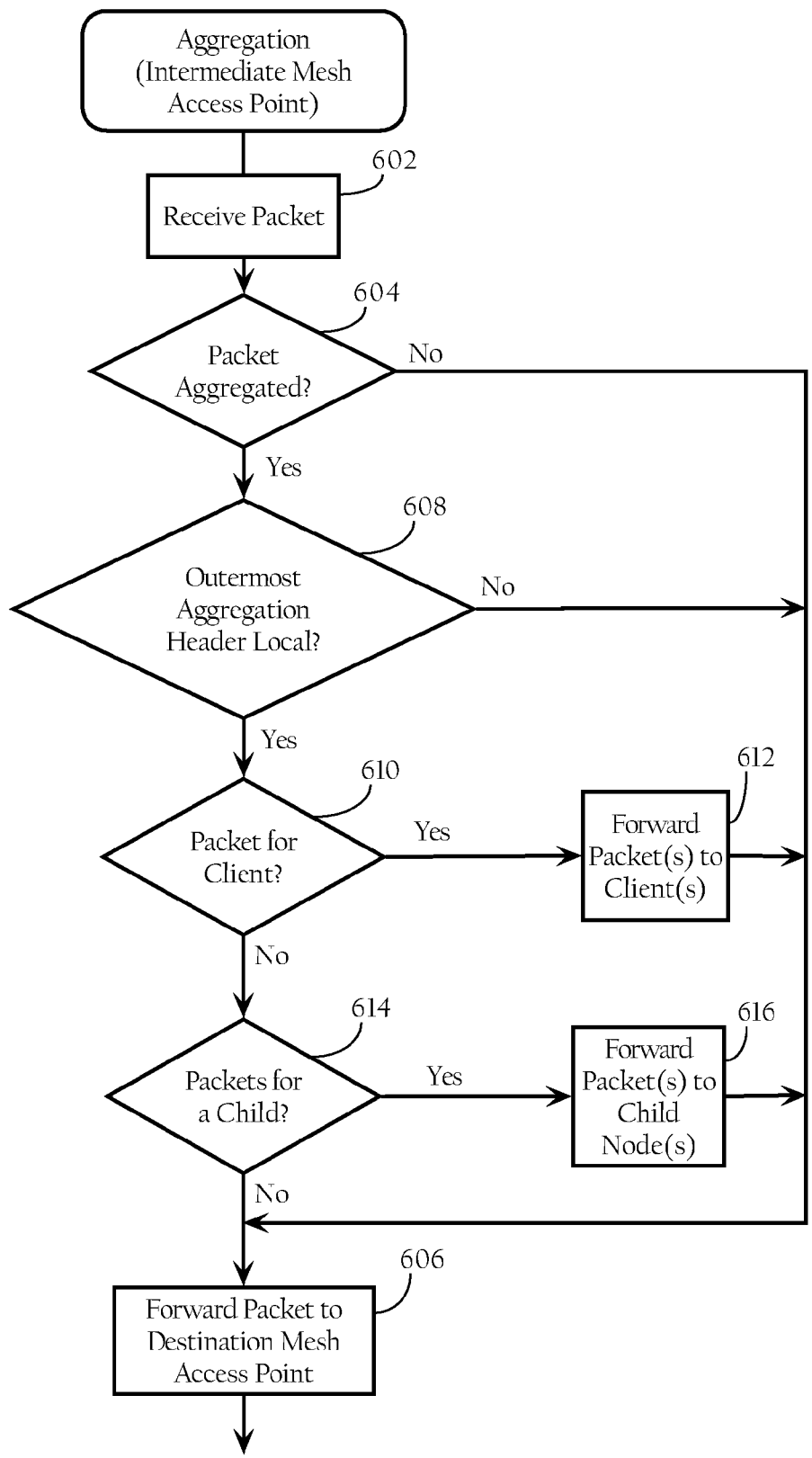
Fig._6

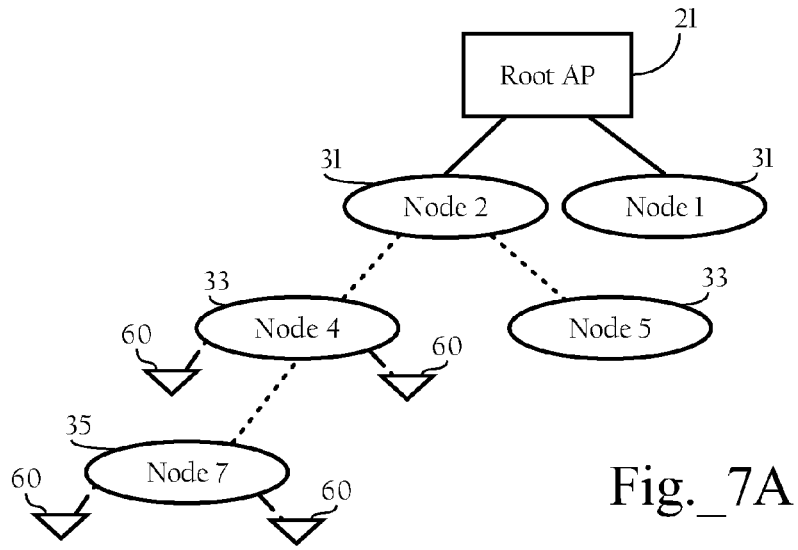
Fig._7A
At Node 2:
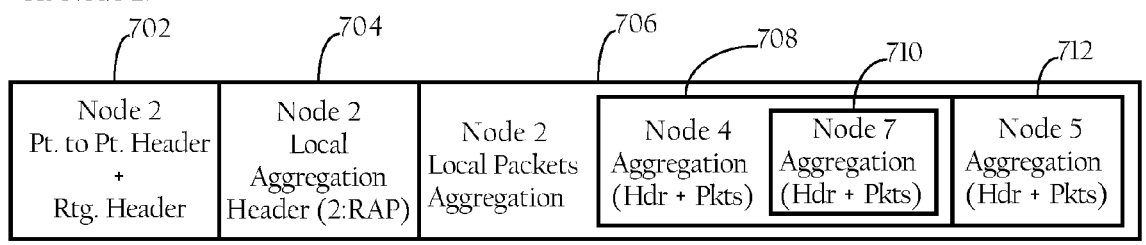
At Node 4:
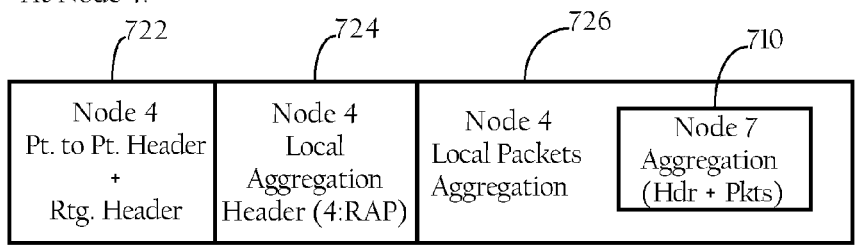
At Node 7:
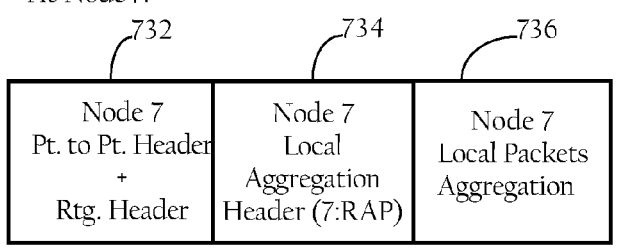
Fig._7B

END-TO-END PACKET AGGREGATION IN MESH NETWORKS

TECHNICAL FIELD

The present disclosure relates generally to wireless mesh networks.

BACKGROUND

Market adoption of wireless LAN (WLAN) technology has exploded, as users from a wide range of backgrounds and vertical industries have brought this technology into their homes, offices, and increasingly into the public air space. This inflection point has highlighted not only the limitations of earlier-generation systems, but also the changing role that WLAN technology now plays in people's work and lifestyles across the globe. Indeed, WLANs are rapidly changing from convenience networks to business-critical networks. Increasingly users are depending on WLANs to improve the timeliness and productivity of their communications and applications, and in doing so, require greater visibility, security, management, and performance from their network.

In wireless networks, the Media Access Control (MAC) protocol of the IEEE 802.11 standard utilizes positive acknowledgements and a collision avoidance scheme to achieve high reliability at the link layer. However, these measures also introduce overhead at the MAC layer. The IEEE 802.11a/b/g physical layer (PHY) introduces additional overhead, such as preambles, forward error correction (FEC), etc. In general, the smaller the data packet size is, the lower the MAC/PHY efficiency is. Most internet packets are small packets. In a mesh network, data packets typically need to traverse multiple hops before reaching the final destination; and the mesh backhaul has to carry traffic from many WLANs. In addition to MAC/PHY overhead, mesh-related headers introduce additional overhead. IEEE 802.11n defines packet aggregation schemes in a WLAN environment, e.g., Media Access Control Service Data Unit aggregation (A-MSDU) and aggregate MAC Protocol Data Unit aggregation (A-MPDU). An A-MSDU is composed of more than one MSDU, while an A-MPDU is composed of more than one MPDU. Both of these aggregation schemes seek to improve MAC/PHY efficiency by aggregating small packets together. Because IEEE 802.11n is designed to operate in one-hop WLANs, these two schemes only aggregate packets intended for the same immediate receiver. Directly adopting IEEE 802.11n's packet aggregating schemes means small packets are assembled and de-assembled at each hop even though they may have the same ultimate destination.

DESCRIPTION OF THE DRAWINGS

FIG. 1 illustrates an example topological diagram of a hierarchical wireless mesh network.

FIG. 2A illustrates a schematic, logical view of the hierarchical relationship between mesh access points and a central controller.

FIG. 2B illustrates an example hardware system, which may be used to implement a central controller.

FIG. 3 illustrates for didactic purposes a hardware system 300, which may be used to implement a mesh access point.

FIG. 4 illustrates an example process flow implemented at a leaf mesh access point.

FIG. 5 illustrates an example process flow implemented at the root mesh access point.

FIG. 6 illustrates an example process flow implemented at an intermediate mesh access point.

FIG. 7A is an example hierarchy of the mesh access points.

FIG. 7B is an example aggregated packets at several mesh access points in the hierarchy of FIG. 7A that include packets having different destinations.

DESCRIPTION OF EXAMPLE EMBODIMENTS

A. Overview

Particular implementations facilitate transmission of packets in the upstream or downstream directions in a wireless mesh network. According to particular implementations, the present invention improves the efficiency of packet transmission by aggregating packets at the root mesh access point or at the source mesh access points thereby minimizing the number of aggregation and de-aggregation operations at intermediate mesh access points. For example, for upstream traffic, source mesh access points may aggregate packets into a single packet and then transmit the aggregated packet towards the root mesh access point. In one implementation, a source mesh access point may be a mesh access point that transports traffic to/from wireless clients directly associated with it through a client radio interface. An intermediate node may be any node between the root mesh access point and a source node. Intermediate root mesh access points that forward these packets need not de-aggregate these packets. Instead, intermediate root mesh access points may directly forward the packets upstream, or they may append two or more packets into one and forward it upstream. The aggregated packets are de-aggregated when they reach the final destination, e.g., the root mesh access point. For downstream traffic, in one implementation, the root mesh access point may aggregate packets destined for wireless clients associated with different mesh access points. In one implementation, the root mesh access point may aggregate all packets destined for the same mesh access point together so that the aggregated packet need not be de-aggregated at intermediate mesh access points.

B. Example Wireless Mesh Network System Architecture

B.1. Network Topology

FIG. 1 illustrates a wireless mesh network according to one implementation of the present invention. In one implementation, the wireless mesh network includes a wireless mesh controller 20, a root mesh access point 21, and a plurality of child wireless mesh access points. In one implementation, the mesh access points are logically arranged in a hierarchy for purposes of routing traffic to the root mesh access point (RAP), and on to a network. In one implementation, this hierarchy can be dynamically configured and shifted based on discovery of wireless management messages between wireless mesh access points, or statically configured.

In one implementation, a hierarchical architectural overlay is imposed on the mesh network of routing nodes to create a downstream direction towards leaf routing nodes 35, and an upstream direction toward the root mesh access point 21. For example, in the hierarchical mesh network illustrated in FIG. 1, first hop mesh access point 2 31 is the parent of intermediate mesh access point 4 33. In addition, intermediate mesh access points 4 33 is the parent to leaf mesh access point 7 35. In one implementation, this hierarchical relationship is used in routing packets between wireless clients 60, or between wireless clients 60 and network 30. Of course, a variety of wireless mesh network configurations are possible, including non-hierarchical configurations, and hierarchical configurations with fewer or greater number of hierarchical tree structures.

As described in more detail below, leaf mesh access points, such as leaf mesh access point 7 35, aggregate packets and send the aggregated packets to the root mesh access point 21 via intermediate mesh access points such as mesh access points 4 33 and 2 31. Also, the root mesh access point 21 aggregates packets and sends the aggregated packets to leaf mesh access points such as leaf mesh access point 7 35 via intermediate mesh access points such as mesh access points 2 31 and 4 33. By aggregating packets at the root mesh access point 21 and at intermediate mesh access points 33 and at the leaf mesh access points 31 minimizes the number of packets to be transmitted at intermediate mesh access points for both upstream and downstream traffic.

The mesh access points in the mesh network, in one implementation, generally include one radio, operating in a first frequency band, and associated wireless communication functionality to communicate with other mesh access points to thereby implement the wireless backbone, as discussed more fully below. All or a subset of the mesh access points, in one implementation, also include an additional radio, operating in a second, non-interfering frequency band, and other wireless communication functionality to establish and maintain wireless connections with mobile stations, such as wireless client 60. For example, in 802.11 wireless networks, the backbone radios on the wireless routing nodes may transmit wireless packets between each other using the 802.11a protocol on the 5 GHz band, while the second radio on each mesh access point may interact with wireless clients on the 2.4 GHz band (802.11b/g). Of course, this relation can also be reversed with backhaul traffic using the 802.11b/g frequency band, and client traffic using the 802.11a band. In addition, the mesh access points may include only a single radio or additional radios.

In one implementation, some wireless mesh networks can include a controller and a plurality of mesh access points that are configured into one or more routing and control hierarchies based on automatic neighbor and route discovery protocols. In some environments, individual mesh access points automatically discover their neighbors and configure hierarchical routing configurations by selecting parent nodes based on a variety of factors. Mesh access points, in some systems, connect to a wireless controller through one or more parents nodes in the routing hierarchy.

B.2. Central Controller

FIG. 2A illustrates the logical relationship between mesh access points and controller 20 relative to wireless clients, according to one possible implementation of the invention. In one implementation, the mesh access points, in connection with the controller 20, implement a hierarchical processing scheme for management of wireless connections with clients 60. For example, each mesh access point may be configured to autonomously implement time-critical link layer functions (such as transmitting acknowledgements), while encapsulating and forwarding wireless management frames (e.g., association requests, etc.) and other client traffic to controller 20 for processing. The encapsulated frames may traverse one or more intermediate mesh access points in the mesh hierarchy as indicated by FIG. 2A.

In other implementations, the controller 20 may be implemented as a wireless domain server (WDS). If the controller 20 is implemented as a WDS, the client side access functionality implemented by the mesh access points may comprise autonomous or so-called "fat" wireless access points. Of course, a variety of other mesh routing and control schemes can be used in connection with the real-time transport protocol described herein.

FIG. 2B illustrates an example hardware system 100, which may be used to implement a controller 20. As FIG. 2B shows, in one implementation, the central controller 20 includes a network interface 102. Controller 20, in one implementation, further comprises a processor 106, a memory 108, one or more software modules stored in memory 108, including instructions for performing the functions described herein, and a system bus 110 operably connecting these components. The central control elements may optionally include an administrative port 112 allowing for administrative access for such purposes as configuration and diagnostic access.

B.3. Wireless Mesh Access Point

FIG. 3 illustrates for didactic purposes a hardware system, which may be used to implement a wireless mesh access point in a wireless mesh network. In one implementation, the wireless mesh access point 300 comprises a processor 308, a read-only memory (ROM) 309, and an electronically erasable read-only memory (EEPROM) 310. The wireless mesh access point 300 may also include one or more of the following: a memory 312, a network interface 314 (e.g., an 802.3 interface) for communication with a LAN, a cache 316 for storing WLAN information, and a persistent memory 318. The wireless mesh access point 300 may also include a backhaul wireless network interface 320 having an antenna 321. Backhaul wireless network interface 320 is configured to transmit and receive messages to/from one or more other wireless mesh access points in a mesh network. The wireless mesh access point 300 may also include a client wireless network interface 322 (e.g., an IEEE 802.11 WLAN interface) having an antenna 323. Client wireless network interface 322 is configured for wireless communication with one or more wireless clients 60. The backhaul wireless network interface 320 and client wireless network interface 322 may be radio interfaces. The wireless mesh access point 300 may also include input/output (I/O) ports 324 and a system bus 330 interconnecting these components.

In some implementations, wireless mesh access point use one or more of the following standards: WiFi/802.11, WiMax/802.16, 2G, 3G, or 4G Wireless, Bluetooth/802.15, Zigbee, or any other suitable wireless communication standards. In one implementation, wireless mesh access point may have a separate access radio, and associated interface components, for communicating with a wireless client or other portable computer. The wireless mesh access points may also include software modules, including Dynamic Host Configuration Protocol (DHCP) clients, transparent bridging, Lightweight Access Point Protocol (LWAPP), Cisco® Discovery Protocol (CDP) modules, wireless access point modules, Simple Network Management Protocol (SNMP) functionality, etc., and device drivers (e.g., network and WLAN interface drivers) stored in persistent memory 318 (e.g., a hard disk drive, flash memory, EEPROM, etc.). At start up, one or more of these software components are loaded into system memory 312 and then accessed and executed by processor 310. In one implementation, the wireless mesh access point 300 includes software or firmware modules for recognizing the reception of network management information and for storing such information in memory (e.g., EEPROM 310).

C. Upstream Aggregation from the Source Mesh Access Point

As described in more detail below, for upstream traffic, multiple upstream packets that travel from a source mesh access point to the root mesh access point may be aggregated at the source mesh access point as a single aggregated packet. As such, intermediate nodes need not de-aggregate these packets, thereby minimizing the amount of processing that the intermediate mesh access points perform. Instead, the mesh access points may directly forward the packets upstream or they may append two or more packets into one and forward it upstream. In one implementation, the aggregated packets are de-aggregated when they reach the final destination, e.g., the root mesh access point.

C.1. Source Mesh Access Point

In the following implementation, a given source mesh access point (e.g., leaf mesh access point 7 35) intends to send a packet to the root mesh access point 21. As described in more detail below, the source mesh access point 7 35 aggregates traffic into a single packet to transmit to the root mesh access point 21. In a particular implementation, a source mesh access point receives wireless packets from wireless clients and reads them onto an upstream transmit queue of a plurality of upstream transmit queues. The selected upstream transmit queue can depend on the access class or other attribute associated with the packet. An aggregation process may operate on the upstream transmit queues. In one implementation, each wireless client frame may be encapsulated by a radio resource management header where the source address corresponds to the source mesh node and the destination address corresponds to the root mesh access point 21 or controller 20. In such an implementation, all wireless client traffic flows through the controller, even if the traffic is destined for a wireless client associated with another mesh access point in the same hierarchy. In other implementations, however, other routing and control schemes can be employed.

FIG. 4 illustrates an example process flow implemented at a source mesh access point such as leaf mesh access point 7 35. The illustrated process may be executed in response to a work entry or other transmit scheduling process invocation. For example, when a process writes a packet onto a transmit queue, it may schedule a work entry to invoke a process that reads and aggregates packets from the upstream transmit queue. As FIG. 4 shows, the source mesh access point 7 35 first selects the next packet in an upstream queue and inserts an aggregation header (402). In one implementation, the upstream queue may be a transmit queue of multiple access class transmit queues. In one implementation, access classes include different types of traffic (e.g., voice, video, best effort, low priority data, etc.), which may have different priorities, size limitations, etc.

The source mesh access point 7 35 then determines if a predefined size limit for the packet is met or exceeded (404). In one implementation, a given mesh access point may aggregate packets with the same access class up to a Media Access Control Service Data Unit (MSDU) maximum length limit (e.g., 2304-octet or smaller). If the predefined limit is exceeded, the source mesh access point 7 35 composes and transmits the packet upstream to the root mesh access point 21 (406).

If the predefined limit is not exceeded, the source mesh access point 7 35 determines if there are more packets in the upstream queue (408). If there are no more packets in the queue, the source mesh access point 7 35 composes and transmits the aggregated packet upstream to the root mesh access point 21. If there are more packets in the upstream queue, the source mesh access point 7 35 selects the next packet in the queue. In one implementation, the source mesh access point 7 35 repeats steps 404 through 408 continue until the predefined size limit is met or exceeded or if there are no more packets in the upstream queue. The source mesh access point 7 35 aggregates all of the selected packets and then composes and transmits the aggregated packet upstream to the root mesh access point 21. In some implementations, the process may also apply other decisional checks, such as whether a timer expires, which causes the aggregation packet to be sent regardless of whether size limits have been exceeded. In other implementations, the aggregation packet may be sent based on QoS requirements of one or more of the packets in the aggregation packet.

In one implementation, intermediate mesh routing nodes that receive the aggregated frames from a child routing node write the frames onto an upstream transmit queue. As described above, the intermediate mesh access points 2 31 and 4 33 may each forward a given aggregated packet to the root mesh access point 21 without needing to de-aggregate the packet thereby reducing processing operations. In addition, these intermediate nodes may also write wireless client frames for their local clients on the upstream transmit queues as well. The intermediate mesh routing nodes may then perform the same process discussed above to optionally append packets from a local wireless client destined for a different mesh access point (e.g., mesh access point 5 33).

In one implementation, when the source mesh access point 7 35 composes the aggregated packet, the source mesh access point 7 35 adds a routing header (e.g., Light Weight Access Point Protocol (LWAPP) header), where the destination is the root mesh access point 21, and adds a point-to-point header, where the destination is the next-hop mesh access point (e.g., mesh access point 4 33) on route to the root mesh access point 21, and an aggregation header.

In one implementation, packets forwarded by intermediate mesh access points arrive at their intended destination via the root mesh access point 21. Other routing schemes are possible. For example, in particular implementations, a given aggregated packet may have packets destined from the intermediate mesh access point. As such, the intermediate mesh access point may partially de-aggregate the packet to remove such packets and the forward the remaining packet upstream to the next intermediate mesh access point. In one implementation, a given intermediate mesh access point may implement a process flow similar to the process flow described below in connection with FIG. 6.

D. Downstream Aggregation from the Root Mesh Access Point

In one implementation, for downstream traffic from the root mesh access point 21, the root mesh access point 21 aggregates packets destined for wireless clients 60 associated with different mesh access points. For example, in the implementation described below, the root mesh access point 21 may aggregate packets destined for wireless clients 60 associated with different mesh access points (e.g., mesh access point 7 35, mesh access point 4 33, etc.).

In particular implementations, the aggregation mechanism may reside in the controller 20 or in the root mesh access point 21. In the following implementation, the aggregation mechanism resides in the root mesh access point 21.

D.1. Root Mesh Access Point

In one implementation, the root mesh access point 21 receives packets randomly from different sources. The packets are sorted into various downstream queues corresponding to different wireless clients 60. In one implementation, the root mesh access point 21 may aggregate packets based on a particular wireless client 60. In one implementation, the root mesh access point 21 may aggregate packets based on a particular mesh access point. In either implementation, the root mesh access point 21 may process packets that are destined for one or more wireless clients and one or more mesh access points on a given route. The root mesh access point 21 knows the topology of a given route and knows the child nodes in the topology. As described in more detail below, the root mesh access point 21 maximizes the transmission efficiency by aggregating packets such that they are as large as possible and minimizes the processing required by each intermediate mesh access point in that they need not de-aggregate packets when forwarding them to their destinations.

FIG. 5 illustrates an example process flow implemented at the root mesh access point 21. As FIG. 5 shows, the root mesh access point 21 selects a mesh access point having the greatest number of hops away and inserts an aggregation header (502). In one implementation, the root mesh access point 21 may utilize any suitable arbitration scheme (e.g., arbitrate by access class, by priority, round robin, etc.) for a mesh access point having the same number of hops away from the root mesh access point 21 as another mesh access point to select a mesh access point.

The root mesh access point 21 then selects a wireless client 60 that is associated with the selected mesh access point (504) to aggregate packets for that wireless client 60. The root mesh access point may arbitrate among wireless clients 60 using any suitable arbitration scheme (e.g., arbitrate by access class, by priority, round robin, etc.).

The root mesh access point then selects the next packet in the downstream client queue that is destined for that wireless client 60 (506). The root mesh access point 21 then determines if the size limit for the selected wireless client 60 is exceeded (508). If the size limit for the selected wireless client 60 is exceeded, the root mesh access point selects another wireless client 60 that is associated with the selected mesh access point to aggregate packets for that wireless client 60.

If the size limit for the wireless client 60 is not exceeded, the root mesh access point 21 then determines if a size limit for the packet is exceeded (510). If the size limit for the packet is exceeded, the root mesh access point 21 composes and transmits the aggregated packet downstream to the selected mesh access point 7 35 (512). In one implementation, if the size limit for the packet is exceeded after a period of time, the root mesh access point 21 composes and transmits the aggregated packet downstream to the selected mesh access point 7 35. In one implementation, when the root mesh access point 21 composes the packet, the root mesh access point 21 assembles and adds a routing header, which designates a destination mesh access point (e.g., mesh access point 7 35) and a point-to-point header, which designates the next-hop mesh access point (e.g., mesh access point 2 31).

If the size limit for the aggregation packet is not exceeded, the root mesh access point then determines if there are more packets in the downstream client queue for the wireless client (514). If there are more packets in the downstream client queue for the wireless client 60, the root mesh access point selects the next packet in the downstream client queue that is destined for the wireless client 60.

If there are no more packets in the downstream client queue for the wireless client 60, the root mesh access point 21 determines if there are more wireless clients associated with the mesh access point (516). If so, the root mesh access point 21 selects another wireless client 60. In one implementation, the root mesh access point 21 adds another map aggregation header for the newly selected wireless client 60. If there are no more wireless clients associated with the mesh access point 7 35, the root mesh access point 21 selects another mesh access point (e.g., mesh access point 4 33) having the greatest number of hops away from the root mesh access point (e.g., the next level up in the topology). In one implementation, the root mesh access point 21 adds another map aggregation header for the newly selected mesh access point 4 33. In some implementations, the process may also apply other decisional checks, such as whether a timer expires, which causes the aggregation packet to be sent regardless of whether size limits have been exceeded. In other implementations, the aggregation packet may be sent based on QoS requirements of one or more of the packets in the aggregation packet.

This specific implementation describes one method, where the root mesh access point aggregates traffic from the bottom up for a particular wireless client. In other implementations, the root mesh access point may aggregate traffic from the top down for a given mesh access point, etc.

Still further, the aggregate packet size limit can be dynamically adjusted in response to channel conditions, such as current data rate, channel coherence and the like. For example, the size of the aggregation packet can be optimized for the link being used. Particular factors that can be considered in this optimization are channel coherence time, Packet Error Rate (PER) and channel load level. The first two factors are physical variables that can be used together to determine the maximum packet size. The third variable determines the probability of collision and, thus, indirectly affects packet size as well. The aggregation packet size determination can be under control of a policy parameter tuple "packet size policy|aggregation delay" which allows a controller to control both packet size and aggregation delay in a proactive manner.

Still further, other packet selection algorithms can be used, such as arbitrating among packets in the queues such that the number of hops traversed is maximized. For example, prioritization or selection of packets for aggregation may be based on hopcount as well as by traffic class/flow priority. By combining these two parameters, packets with the same priority but with more hops to traverse get a relative advantage over packets with less hops to traverse. The degree to which hopcount affects aggregation priority can be under control of a policy parameter tuple "Distributed QoS policy/AC bias." Whereas the former allows controlled compensation for the size of a mesh network, the latter allows controlling the relative prioritization of traffic classes in the process aggregating packets. In this manner, aggregated packets that reference a higher number of destinations get priority of over packets that reference a smaller number of destinations. The reason is that this limits the number of medium access events required to deliver frames to the next hop.

E. Intermediate Mesh Access Point

In particular implementations, a given intermediate mesh access point (e.g., mesh access point 2 31) that receives an aggregated packet from the mesh access point above, which could be the root mesh access point 21 or another intermediate mesh access point, may apply the process flow described below in connection with FIG. 6. While the following example describes a downstream direction, the illustrated process may also apply to implementations involving an upstream or lateral direction. For example, a given intermediate mesh access point that receives an aggregated packet from the mesh access point below, which could be a source mesh access point or another intermediate mesh access point, may apply the process flow described below in connection with FIG. 6. As described in more detail below, a given intermediate mesh access point (e.g., intermediate mesh access point 2 31) may forward a given packet to the appropriate destination (e.g., leaf mesh access point 7 35 or a local wireless client 60) without needing to de-aggregate the packet. Furthermore, the intermediate mesh access point 2 31 may optionally append packets from a local wireless client destined for a different mesh access point (e.g., mesh access point 5 33).

FIG. 6 illustrates an example process flow implemented at an intermediate mesh access point. FIG. 7A is an example hierarchy of the mesh access points. As FIG. 6 shows, the intermediate mesh access point 2 31 (labeled Node 2) first receives a packet from the root mesh access point 21 (602). The intermediate mesh access point 2 31 then determines if the packet is an aggregated packet (604). If the packet is not an aggregated packet, the intermediate mesh access point 2 31 forwards the packet to the destination mesh access point (606). If the packet is an aggregated packet, the intermediate mesh access point 2 31 determines if the outermost aggregation header is local (608).

FIG. 7B is an example aggregated packets at several mesh access points in the hierarchy of FIG. 7A that include packets having different destinations. These example packets may travel in any direction (e.g., upstream, downstream, etc.) In this specific implementation, the outermost header 702 indicates packets that are local to mesh access point 2 31. In the outermost header 702, the point-to-point header designates the next-hop mesh access point (e.g., mesh access point 2 31) and the routing header designates one or more destination mesh access points (e.g., mesh access point 2 31, mesh access point 5 33 (labeled Node 5), mesh access point 7 35 (labeled Node 7), etc.).

If the outermost aggregation header is not local, the mesh access point 2 31 forwards the packet to the destination mesh access point. If the outermost aggregation header is local, the mesh access point 2 31 determines if the aggregated packet is destined for a local wireless client 60 that is associated with that mesh access point 2 31 (610). As FIG. 7 shows, the aggregated packet includes a local aggregation header 704. In one implementation, the local aggregation header 704 may indicate whether the any portions of the aggregated packet are destined for a local wireless client 60. In this implementation, there are local packets 706. As such, the intermediate mesh access point 2 31 extracts any local packets 706 for itself and the forwards the appropriate packets 706 to its local wireless client(s) 60 (612) and forwards the rest of the packets to the destination mesh access point (606).

The intermediate mesh access point 2 31 then determines if there are any packets that are destined for its child node(s) (614). In one implementation, the outermost header 702 may indicate any such packets. If so, the intermediate mesh access point 2 31 forwards the packets to the appropriate child nodes (616) and forwards the rest of the packets to the destination mesh access point (606). For example, in this particular implementation, mesh access point 4 33 (labeled Node 4) and mesh access point 5 33 are the child nodes of intermediate mesh access point 2 31, and there are packets 710 and 712 destined for these child nodes, respectively. Before sending the packet(s), mesh access point 2 31 adds the appropriate headers. For example, for mesh access point 4 33, mesh access point 2 31 adds point-to-point and routing headers 722 and an aggregation header 724 to the local packets aggregation 726 for mesh access point 4 33. If there are no packets destined for its child node(s), the intermediate mesh access point 2 31 forwards the packet to the destination mesh access point (606).

The process flow described above in connection with FIG. 6 may apply to all intermediate mesh access points (e.g., mesh access point 4 33) as each such mesh access point receives an aggregated packet. For example, if mesh access point 2 sends a packet to mesh access point 4, mesh access point 4 33 would apply the apply the process of FIG. 6 to extracts any local packets 726 for itself and the forwards the appropriate packets 726 to its local wireless client(s) 60. If there are any packets that are destined for its child node, mesh access point 4 33 forwards the packets to the appropriate child node (e.g., mesh access point 7 35. Before sending the packet, mesh access point 4 33 adds the appropriate headers. For example, for mesh access point 7 35, mesh access point 4 33 adds point-to-point and routing headers 732 and an aggregation header 734 to the local packets aggregation 436 for mesh access point 7 35.

Note that for both downstream and upstream traffic, in one implementation, a given intermediate mesh access point may receive not only aggregated packets from the root mesh access point or source mesh access points, but the intermediate mesh access point may also receive backhaul traffic from other mesh access points and wireless client traffic from local wireless clients 60 directly associated with the intermediate mesh access point. If a given intermediate mesh access point receives wireless client traffic from its own local wireless clients 60, the intermediate mesh access point may optionally append packets from its wireless clients 60 to the aggregated packet and then transmit the aggregated packet to the appropriate mash access point. In one implementation, the intermediate mesh access point may de-aggregate a given aggregated packet partially or fully, as appropriate, in order to route packets to their appropriate destinations. Overall, de-aggregation among intermediate mesh access points is minimized.

Because particular implementations operate at the routing layer, it is not necessary to identify each mesh access point by its 6-octet MAC address. Thus, the aggregation overhead may be further reduced by identifying each mesh access point under the same root mesh access point using a unique 1-octet node ID instead of a 6-octet MAC address. In one implementation, this unique 1-octet node ID may be mapped to the corresponding 6-octet MAC address in a routing table.

In one implementation, a per-access class based latency metric may be applied at each mesh access point to ensure that any aggregation delay at each hop and any end-to-end aggregation delay are upper bounded and to ensure that quality of service (QoS) constraints are observed. Implementations described herein may be combined with hop-by-hop aggregation schemes such as Aggregate Media Access Control Service Data Unit (A-MSDU) aggregation or aggregate MAC Protocol Data Unit (A-MPDU) aggregation, as the end-to-end aggregated packet appears as a single MSDU to the hop-by-hop aggregation schemes.

Implementations described herein improve the overall mesh network throughput. Moreover, unlike hop-by-hop packet aggregation schemes, implementations described herein exploit the network topology information and only require aggregation and de-aggregation at the source mesh access points and the ultimate destination mesh access points. Thus, implementations described herein reduce the aggregation and de-aggregation overhead at intermediate mesh access points in a mesh network.

The present invention has been explained with reference to specific embodiments. For example, while embodiments of the present invention have been described as operating in connection with IEEE 802.11 networks, the present invention can be used in connection with any suitable wireless network environment. Other embodiments will be evident to those of ordinary skill in the art. It is therefore not intended that the present invention be limited, except as indicated by the appended claims.

What is claimed is:

1. A non-transitory storage medium comprising instructions stored therein, the instructions operable, when executed to cause a processor to:

access one or more transmit queues, each corresponding to a mobile station wirelessly connected to a given wireless mesh access point of a plurality of mesh access points, wherein the one or more transmit queues include a plurality of received packets;

select a first mesh access point of the plurality of mesh access points;
select a transmit queue corresponding to a first mobile station wirelessly connected to the selected first mesh access point;
aggregate packets that are destined for the selected first mobile station up to a first size limit for mobile stations or a second size limit for aggregation packets, the first size limit being the maximum aggregation size limit for a particular mobile station before another mobile station is selected for aggregation;
determine that the packets destined for the selected first mobile station have been aggregated up to the first size limit but not the second size limit;
upon the determination that the packets destined for the selected first mobile station have been aggregated up to the first size limit but not the second size limit,
select a second mobile station that is wirelessly connected to the selected first mesh access point; and
aggregate packets that are destined for the second mobile station up to the first size limit or the second size limit; and
compose an aggregation packet including the aggregated packets and transmit the aggregation packet to the selected first mesh access point.

2. The storage medium of claim 1 wherein the logic is further operable to apply a latency metric at each mesh access point to limit aggregation delay within a QoS requirement.

3. The storage medium of claim 1 wherein the logic is further operable to prioritize packets based on a number of hops traversed or to be traversed.

4. The storage medium of claim 1 wherein the logic is further operable to determine a maximum size of an aggregation packet from which the second size limit is derived based on a packet error rate and wireless channel load related to the selected first mesh access point or a client device.

5. The storage medium of claim 1 wherein the logic is further operable to determine a maximum size of an aggregation packet from which the second size limit is derived based on a packet collision probability related to the selected first mesh access point or a client device.

6. The storage medium of claim 1 wherein the selected first mesh access point is a mesh access point having the greatest number of hops away.

7. A method comprising:
accessing one or more transmit queues, each corresponding to a mobile station wirelessly connected to a given wireless mesh access point of a plurality of mesh access points, wherein the one or more transmit queues include a plurality of received packets;
selecting a first mesh access point of the plurality of mesh access points;
selecting a transmit queue corresponding to a first mobile station wirelessly connected to the selected first mesh access point;
aggregating packets that are destined for the selected first mobile station up to a first size limit for mobile stations or a second size limit for aggregation packets, the first size limit being the maximum aggregation size limit for a particular mobile station before another mobile station is selected for aggregation;
determining that the packets destined for the selected first mobile station have been aggregated up to the first size limit but not the second size limit;
upon the determination that the packets destined for the selected first mobile station have been aggregated up to the first size limit but not the second size limit,
selecting a second mobile station that is wirelessly connected to the selected first mesh access point; and
aggregating packets that are destined for the second mobile station up to the first size limit or the second size limit; and
composing an aggregation packet including the aggregated packets and transmit the aggregation packet to the selected first mesh access point.

8. The method of claim 7 further comprising applying a latency metric at each mesh access point to limit aggregation delay within a QoS requirement.

9. The method of claim 7 further comprising prioritizing packets based on a number of hops traversed or to be traversed.

10. The method of claim 7 further comprising determining a maximum size of an aggregation packet from which the second size limit is derived based on a packet error rate and wireless channel load related to the selected first mesh access point or a client device.

11. The method of claim 7 further comprising determining a maximum size of an aggregation packet from which the second size limit is derived based on a packet collision probability related to the selected first mesh access point or a client device.

12. The method of claim 7 wherein the selected first mesh access point is a mesh access point having the greatest number of hops away.

13. The method of claim 7 further comprising inserting an aggregation header for the selected first mesh access point, the aggregation header being inserted before the aggregation of the packets that are destined for the selected first mobile station.

14. An apparatus comprising:
one or more processors;
a memory;
one or more wireless network interfaces; and
computer-readable instructions encoded in one or more tangible media for execution and when executed operable to cause the one or more processors to:
access one or more transmit queues, each corresponding to a mobile station wirelessly connected to a given wireless mesh access point of a plurality of mesh access points, wherein the one or more transmit queues include a plurality of received packets;
select a first mesh access point of the plurality of mesh access points;
select a transmit queue corresponding to a first mobile station wirelessly connected to the selected first mesh access point;
aggregate packets that are destined for the selected first mobile station up to a first size limit for mobile stations or a second size limit for aggregation packets, the first size limit being the maximum aggregation size limit for a particular mobile station before another mobile station is selected for aggregation,
determine that the packets destined for the selected first mobile station have been aggregated up to the first size limit but not the second size limit;
upon the determination that the packets destined for the selected first mobile station have been aggregated up to the first size limit but not the second size limit,
select a second mobile station that is wirelessly connected to the selected first mesh access point; and
aggregate packets that are destined for the second mobile station up to the first size limit or the second size limit; and compose an aggregation packet including the aggregated packets and transmit the aggregation packet to the selected first mesh access point.

15. The apparatus of claim 14 wherein the instructions are further operable cause the one or more processors to apply a latency metric at each mesh access point to limit aggregation delay within a QoS requirement.

16. The apparatus of claim 14 wherein the instructions are further operable cause the one or more processors to prioritize packets based on a number of hops traversed or to be traversed.

17. The apparatus of claim 14 wherein the instructions are further operable cause the one or more processors to determine a maximum size of an aggregation packet from which the second size limit is derived based on a packet error rate and wireless channel load related to the selected first mesh access point or a client device.

18. The apparatus of claim 14 wherein the instructions are further operable cause the one or more processors to determine a maximum size of an aggregation packet from which the second size limit is derived based on a packet collision probability related to the selected first mesh access point or a client device.

19. The apparatus of claim 14 wherein the selected first mesh access point is a mesh access point having the greatest number of hops away.

* * * * *